April 12, 1960  W. V. DE NICOLO  2,932,083
METHOD FOR CUTTING SLEEVES AND RINGS
Filed June 1, 1955  3 Sheets-Sheet 2
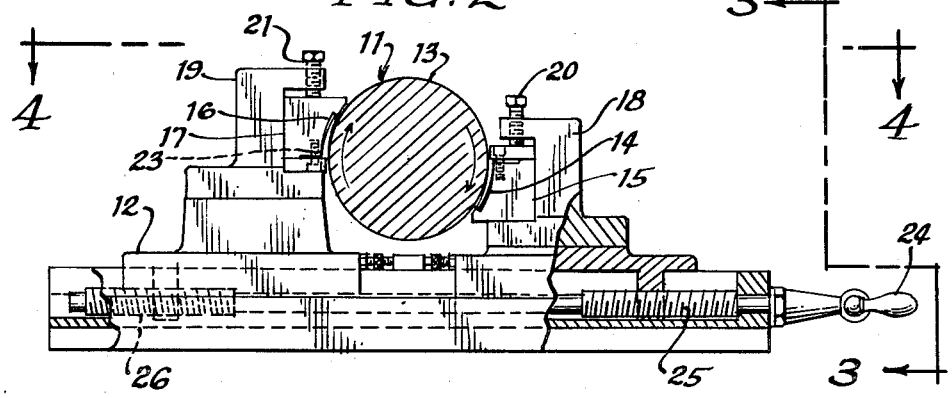
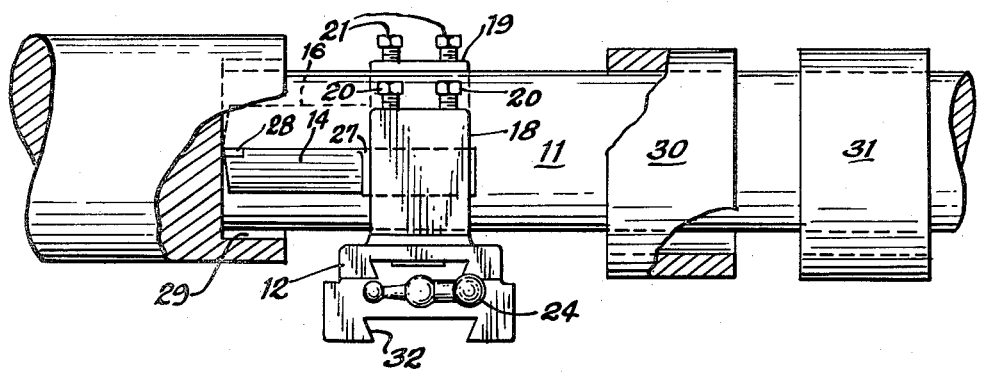
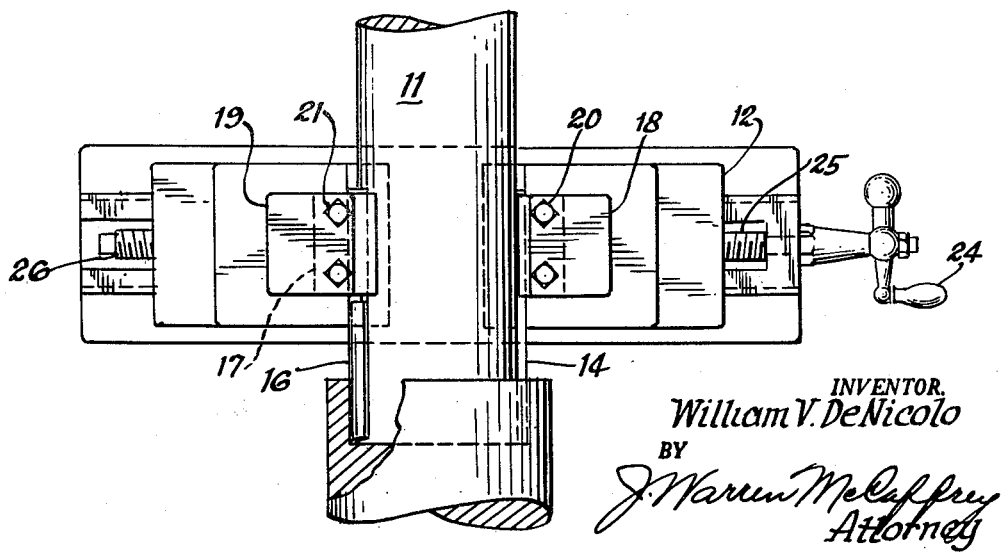
INVENTOR.
William V. DeNicolo
BY
J. Warren McCaffrey
Attorney April 12, 1960   W. V. DE NICOLO   2,932,083
METHOD FOR CUTTING SLEEVES AND RINGS
Filed June 1, 1955   3 Sheets-Sheet 3
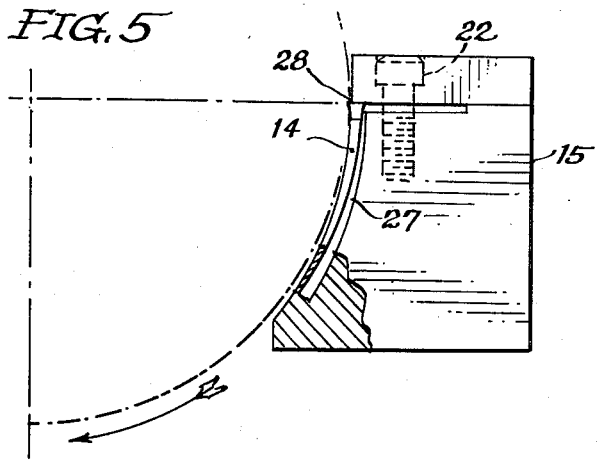
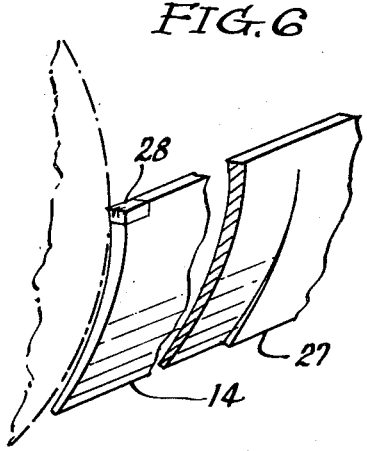
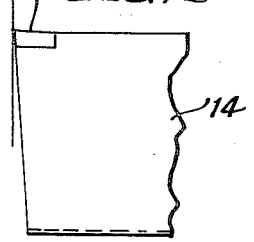
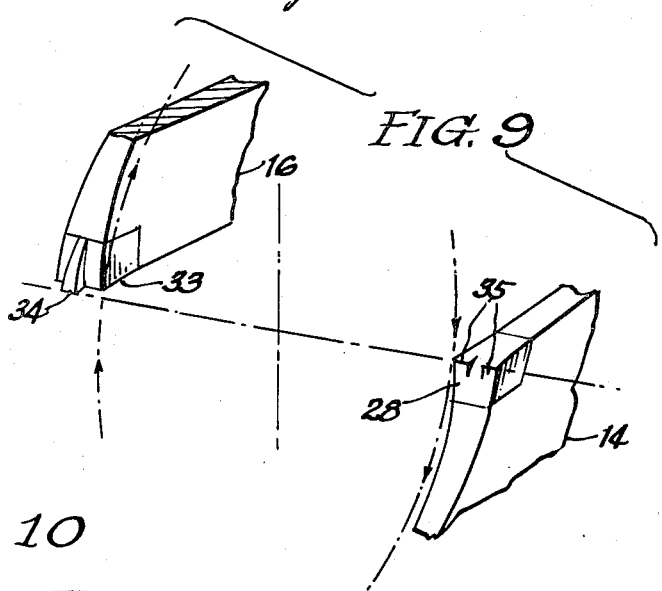
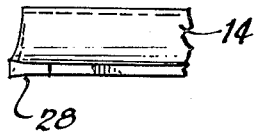
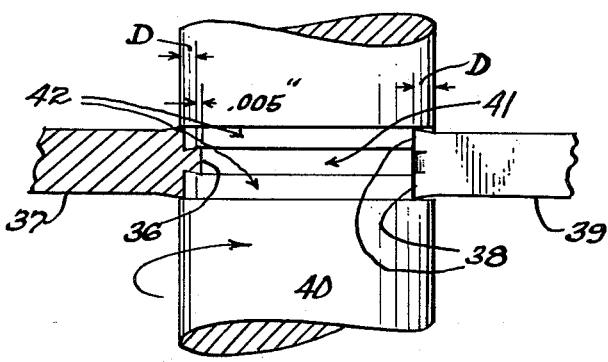
INVENTOR.
William V. DeNicolo
BY
J. Warren McCaffrey
Attorney

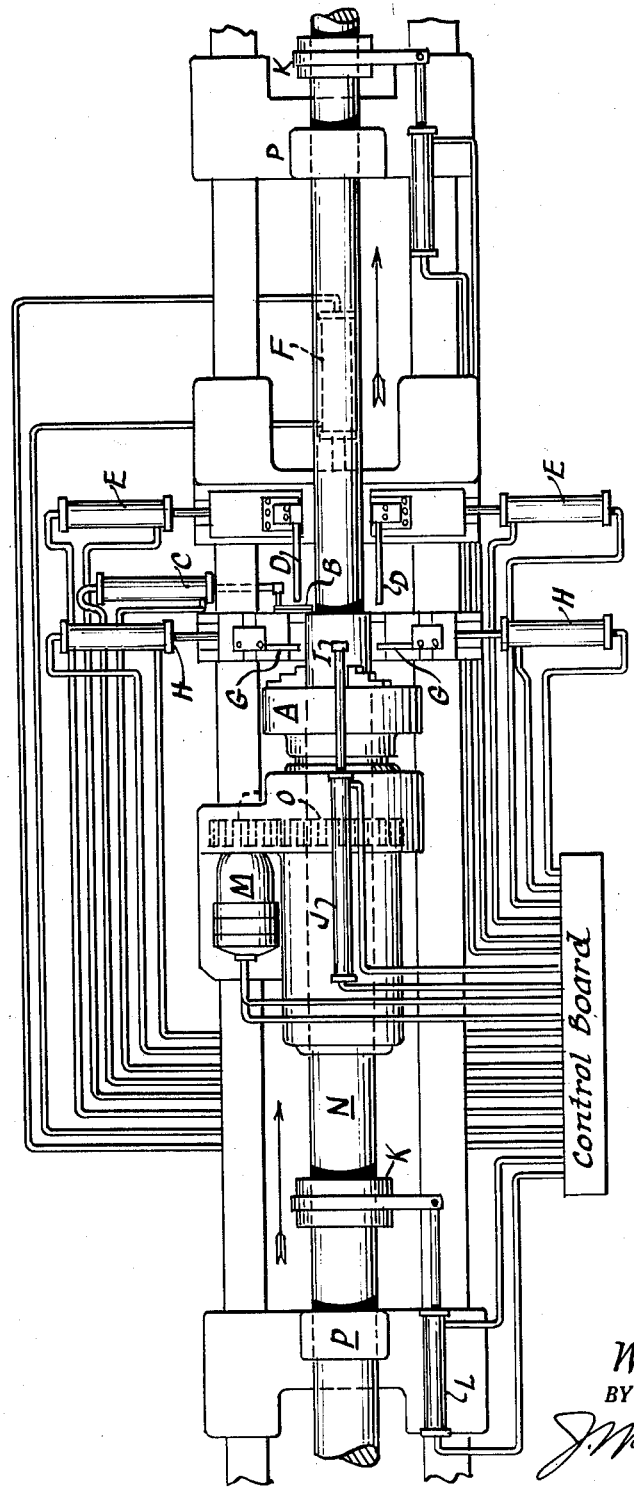

United States Patent Office 2,932,083
Patented Apr. 12, 1960

2,932,083

METHOD FOR CUTTING SLEEVES AND RINGS

William V. De Nicolo, Chicago, Ill.

Application June 1, 1955, Serial No. 512,549

7 Claims. (Cl. 29—417)

This invention is a new method for cutting metal so as to eliminate the enormous waste of material resulting from conventional cutting operations.

Normally drilling boring, or grinding operations result in metal chips, curls or dust which can only be disposed of as waste materials. It is an object of this invention to eliminate such enormous waste and to keep the actual waste in the cutting operation to a minimum.

In machine shop operations there is one which is called trepanning that is generally defined as a process of cutting circular grooves or recesses on a plane surface about a given center.

This invention relates to a process for making a circular cut in a piece of round metal bar stock so that the circular core resulting from the cut can be used as bar stock for another metal product, and cutting the tube resulting from the same circular cut into sleeves or rings.

It is an object of this invention to make such a clean cut of the circular core from the bar of metal that neither the inside surface of the resulting tube or cylinder nor the surface of the circular core need for many uses be further machined.

The advantages accruing from the method of cutting sleeves or rings from circular bar stock by the operations of this invention are numerous and their accomplishment is primarily due to the use of specially designed tools and set-ups for that purpose.

More specifically this invention comprises a new method for cutting a cylindrical metal core out of round metal stock and cutting the resulting cylinder into sleeves or rings with a minimum loss of metal and in a minimum length of time utilizing one or more special cutting tools set up in and held by specially designed blocks.

It will be readily recognized by those skilled in the art that the conception of the process of this invention resulted in the designing of special tools and a machine for carrying out the new process. In other words the invention comprises both the method of cutting sleeves or rings off of a cylindrical core and the means for making such cuts. The actual performance of a special designed sleeve cutting lathe has proven the value of the process herein disclosed. Accordingly the description of the drawings and the specification following covers both the process invented and the means invented for performing the process.

Figure 1 is a schematic drawing of a sleeve cutting lathe looking down on the machine with a piece of bar stock extending through the head stock and tail stock after cutting sleeves or rings not shown from that portion of the bar stock having the narrower diameter.

Figure 2 is an end view looking toward the tail stock or carriage from the head stock or gear box end of a conventional hand adjusted engine lathe showing the end of a piece of bar stock held between the cutting tools with the rotation of the bar stock indicated.

Figure 3 is a side view of the same lathe carriage with a piece of bar stock in cutting position taken along line 3—3 of Figure 2 but showing in addition a section of the bar stock before cutting with a portion broken away so as to show the cutting tool in operation, and also a pair of sleeves after cutting travelling along the cylindrical core.

Figure 4 is a plan view of the apparatus of Figure 3 looking down along line 4—4 of Figure 2.

Figure 5 is an enlarged end view of the one cutting tool held by the tool holding block positioned at 3 to 4 o'clock around the bar stock as shown in Figure 2.

Figure 6 is a perspective broken sectional view of the cutting tool shown in Figure 5.

Figure 7 is an enlarged side view of the cutting tool in Figure 5.

Figure 8 is an enlarged top view of the cutting tool in Figure 5.

Figure 9 is a much larger perspective view of the two tools shown in Figure 2 so as to illustrate their relative positions and the construction of their cutting tips.

Figure 10 comprises a very much enlarged view of the radial cutting tools employed to cut off sleeves or rings after the longitudinal cutting tools had been withdrawn from cutting a cylindrical tube from the cylindrical core.

With reference to Figure 1 of the accompanying drawings there is outlined a schematic diagram of a sleeve producing lathe which will effectively perform the several steps in the operating cycle of the process of this invention while utilizing all the featured elements of the apparatus of this invention. The diagram is designed to show the various movements of the work cycle as simply as possible, for which reason the various components of the machine are not necessarily shown in the position they will actually occupy in the final construction of this special purpose lathe. For the same reasons all timing and control devices are not shown, although the hydraulic cylinders are shown connected to a single control panel at the side of the machine.

Because Figure 1 is a schematic drawing whereas the remaining figures of the drawings are conventional the inventor has elected to use alphabetic reference characters to designate the important elements of the machine in describing the work cycle when cutting sleeves from circular bar stock. He uses Arabic numerals to designate the elements of all the other drawings.

Referring to the schematic diagram the work cycle of this sleeve cutting lathe is described as follows. The chuck A is for holding the bar stock N in position for cutting. Stock feeds K are retracted to starting positions by cylinders L. Stock stop B is withdrawn by cylinder C. Cutting tools D are advanced radially by cylinders E towards the bar stock. Push off finger I is retracted to starting position by cylinder J. The work spindle including chuck A and bar stock N is rotated by motor M through gears O. Then the cutting tools D, locked in position around the narrower diameter of the bar stock N with some clearance between the tools and the bar, are fed longitudinally into the shoulder formed by the larger diameter of the bar stock. The tools cut into the thicker section of the bar to a depth equal or slightly greater than the length of the ring or sleeve to be produced. The movement of the tools forward along the bar is caused by cylinder F. When the cutting tools D have cut into the bar as far as desired for the purpose, they are withdrawn from the work longitudinally by cylinder F also, and then withdrawn radially from bar N by cylinders E. Thereupon cut off tools G are fed radially into the work bar N by cylinders H to cut the sleeve or ring free from the cylindrical tube already cut from bar stock N. After severing the sleeve or ring as the case may be, the tools G are withdrawn radially outward by the same cylinders H. Then push off finger I is moved forward by cylinder J to push sleeve or ring longitudinally along the smaller diameter section of bar N to clear the already retracted cutting tools D. Thus the cutting of a sleeve or ring from the round bar stock N has been completed and the machine automatically prepares to repeat the work cycle by cylinder C moving stop B into position to stop the forward movement of bar N, when chuck A releases its grip on bar N. Then the stock feeds K operated by cylinders L move the bar stock N horizontally through bearings P and chuck A until the shoulder of bar stock N caused by the cutting off of the sleeve or ring strikes stop B. The machine is now in position to automatically repeat the work cycle as just described.

Referring now to Figure 2 and the remaining figures in the drawings wherein Arabic numerals are used to identify the same elements we see a cross section of the circular bar stock 11 at a point to the right of bar stop B in Figure 1 while looking from the chuck toward the carriage 12 of the lathe. Here the bar has already been cut to the smaller diameter 13 by the circular cutting operations of cutting tool 14 held in position by tool holding block 15, and cutting tool 16 held in position by tool holding block 17, all of which are mounted on carriage 12 of the lathe and firmly held thereon by left and right bent arms 18 and 1. Stout set screws 20 and 21 in the bent arms hold tool holding blocks 15 and 17 firmly. Likewise set screws 22 and 23 hold cutting tools 14 and 16 respectively in the tool holding blocks 15 and 17 securely against the rotating torque of bar 11. A machine handle 24 with attached right and left hand screws 25 and 26 are shown as the conventional means for moving the tool holding blocks towards one another into exact positions around bar 11 on the lathe but in actual practice this would be accomplished by hydraulic cylinders or similar means. Lathe carriage 12 in reality is an attachment that provides for adjustment of the cutting tools 14 and 16 with small but necessary clearances around bar 11. This attachment (12) is in turn mounted on a coventional carriage not shown which would ride back and forth in the lathe bed under manipulation of a hand wheel not shown in the usual conventional engine or turret lathe.

In Figure 3 we have a side view of the engine lathe carriage 12 with bar stock 11 in position and a section of the larger diameter of bar stock broken away so as to show cutting tool 14 cutting a circular groove in the bar. The larger shank 27 of cutting tool 14 is visible extending to either side of the arm 18 that holds the tool holding block not seen. The hardened tip 28 of cutting tool 14 is shown cutting a metal curl or shaving off the bar to form groove 29. Sleeves or rings 30 and 31 have been cut off bar 11 by radial cutting tools not shown here but in Figure 1 and have been moved along the narrower diameter of bar 11 after the longitudinal withdrawal of cutting tools 14 and 15 and their radial withdrawal from bar 11 so as to permit their passing to the right of lathe carriage 12 as described in the operating cycle in connection with Figure 1. Groove 32 at base of lathe carriage is for attaching said carriage 12 to another conventional carriage not shown and to permit movement crosswise thereon so that cutting tools 14 and 16 can be adjusted in position to make longitudinal cut 29 in bar stock 11. The conventional carriage with element not shown to fit groove 32 moves along the lathe bed as stated in previous paragraph.

In Figure 4 a portion of the bar stock 11 is broken away so as to show cutting tool 16, in position at 9 to 10 o'clock around the center of the bar stock as shown in Figure 2, cutting a circular groove in the larger diameter section of bar stock 11. The top edge of cutting tool 14 is also seen.

In Figure 5 by reason of enlargement we see how the set screw 22 holds the cutting tool 14 in the block 15 firmly against the rotation of the bar stock and how the tool is set in the block to allow clearances on both sides. The tool actually is a curved knife with an enlarged shank 27 or handle which is clamped into the tool holding block 15.

In Figure 6 we see in perspective the curvature of cutting tool 14 and the handle or shank 27, which is also curved, and which is the part of the tool which is fastened in the tool holding block.

Figures 7 and 8 are enlarged to show some more of the details of the cutting tools of this invention, particularly how the tip 28 of cutting tool 14 projects forward so as to make the cut, and is shaped to allow clearances for any grit, shavings, etc. produced in the cutting operation.

Figure 9 is an enlarged view in perspective showing the relative positions of cutting tool 14 at 3 to 4 o'clock around the center of any bar stock, and cutting tool 16 at 9 to 10 o'clock. It also shows the detail of the cutting tips to the relative tools. Actually the cutting of the rotating bar stock is first at 9 o'clock by the projecting edge 34 of tip 33 and secondly at 3 o'clock by two projecting edges 35 of tip 28. To accomplish these successive cuttings the projecting edge 34 of tip 33 is advanced .005 of an inch forward of the two projecting edges 35 of tip 28. In that way edge 34 cuts a slight groove equal to the width of 34, and then edges 35 widen the groove equal to the width of tip 28.

In Figure 10 there is illustrated the same design of cutting edges to make straight cuts with straight radial cutting tools as are illustrated in Figure 9 on curved longitudinal cutting tools. Edge 36 on the straight cutting tool 37 corresponds to edge 34 on the curved cutting tool 16, while edges 38 on 39 correspond to 35 on 14. The bar stock 40 can be any kind of circular stock and not necessarily a cylinder or tubular section that has been cut away from a cylindrical core as disclosed herein. These specially designed radial cutting tools can be used to cut into any round surface.

An important feature of this invention is the setting of cutting tool 37 slightly in advance of cutting tool 39 radially that is, for example .005 of an inch as shown, in order that edge 36 cuts circumferential groove 41 first and then edges 38 widens the groove by cutting off material indicated as 42 on both sides of 41. The view shown is looking down on the radial straight cutting tools cutting into any circular material 40 in bar shape, so that straight radial cutting tool 37 is illustrated with top portion broken away.

In the same manner the curved longitudinal cutting tool 16 with tip 33 and cutting edge 34 is advanced slightly ahead longitudinally of cutting tool 14 with tip 28 having two cutting edges 35, in order that edge 34 will cut its circular groove first and then edges 35 widen that circular groove. The distance that cutting edge 34 is advanced longitudinally of the bar stock ahead of edges 35 is immaterial and need not be as shown .005 of an inch, but it must be advanced some distance in order to make the first circular cut.

An important observation to make here is that the bar 11 is shown in Figure 2 rotating clockwise, and cutting tool 14 is held at 3 to 4 o'clock, while cutting tool 16 is held at 9 to 10 o'clock. It is within the scope of this invention that the bar stock be rotated counter clockwise also. In which case, however, cutting tool 16 would be set into tool holding block 15 and cutting tool 14 would be set into tool holding block 17 and both tools would have the opposite curvature to that shown. Such a setting would permit the first circular cutting by edge 34 at 4 o'clock followed by widening the groove by cutting edges 35 at 10 o'clock.

Although the several drawings illustrate cutting tools in pairs it is within the scope of this invention to employ only one curved blade cutting tool to make the circular cut when separating the cylinder from the core of the metal bar stock and only one straight cutting tool when cutting the cylinder from the bar stock. However, experience proves the advisability of multiple cutting tools because it diminishes the wear on a single tool. The use of multiple curved cutting tools and multiple straight cutting tools decreases maintenance of the tools and although you use more tools their life is measureably lengthened.

It is also advisable to space the longitudinal or curved cutting tools at equal distances around the circumference of the bar stock. For example, it is preferred when using two longitudinal cutting tools for cutting a circular groove to have the actual cutting edges represented by 34 and 35 at exactly 180° from each other; when using three cutters to have the cutting edges 120° from each other; and when using four cutters to have the cutting edges 90° from each other. The same applies to the radial cutting tools, and thus prolonging the tool life by equalizing and distributing the work load will be recognized as desirable to those skilled in the art.

It will be understood also that the method and means for cutting sleeves or rings from a circular bar stock disclosed herein is equally adaptable for operating on bar stock of metallic and non-metallic nature as well, such as wood, plastic materials, and non-ferrous metals also.

What I claim as invention:

1. Method of cutting sleeves off of bar stock comprising cutting a cylinder from the bar stock by making a longitudinal cut into the end of said bar stock with a curved cutting tool having a curvature corresponding to the groove being cut so as said tool can follow into said groove as said cutting progresses, withdrawing said curved cutting tool after cutting a groove of desired longitudinal depth, and thereafter cutting said cylinder into sleeves by making a radial cut through said cylinder only with a straight cutting tool, and repeating said operations as often as desired.

2. Method of cutting rings off of bar stock comprising cutting a cylinder from said bar stock by making a longitudinal cut into the end of said bar stock with multiple curved cutting tools having the same curvature corresponding to the groove being cut so as said tools can follow into said groove as said cutting progresses to a predetermined longitudinal depth, withdrawing said curved cutting tools then cutting said cylinder into rings by making a circumferential cut through said cylinder only with multiple straight cutting tools, while having said multiple curved cutting tools equally spaced from each other around said end of said bar stock, and also having said multiple straight cutting tools equally spaced from each other around the circumference of said bar stock, removing said rings from the area of said cutting tools, and then repeating said operations.

3. Method of cutting sleeves from bar stock and preserving the center core of said stock comprising first making a longitudinal cut into said stock with multiple circular cutting tools to separate a cylinder from the center core, then withdrawing said circular cutting tools from between said cylinder and said center core, thereafter making a radial cut into said separated cylinder with multiple straight cutting tools to cut off a sleeve from said cylinder, then withdrawing said straight cutting tools, and lastly moving said sleeve along said core away from all cutting tools so as to permit repeating the operations in the same order as often as the number of sleeves desired.

4. Method of cutting rings from bar stock and preserving the center core of said stock for further uses comprising first making a longitudinal cut into said stock with multiple circular cutting tools so as to separate a cylinder from said core, then withdrawing said circular cutting tools from between said cylinder and said core, thereafter making a radial cut into said cylinder only with multiple straight cutting tools to sever a ring from said cylinder, then withdrawing said straight cutting tools, and lastly moving said ring along said core away from all cutting tools so as to clear said core in order to repeat said operations in the same order as long as said original bar stock lasts.

5. Method of cutting sleeves from round bar stock without destroying the core of said bar stock consisting of first making a longitudinal cut into said bar stock with one or more pairs of circular cutting tools so as to separate a cylinder from said core, then withdrawing said circular cutting tools and thereafter making a radial cut into said cylinder with one or more pairs of straight cutting tools so as to sever a sleeve from said cylinder, then withdrawing said straight cutting tools and thereafter moving said severed sleeve along said core away from all cutting tools, and thereafter repeating said operations in the same sequence to cut additional sleeves from said bar stock without damaging said core for other uses in which a bar of its size is desired.

6. Method of cutting rings from round bar stock without destroying the core of said bar stock consisting of first making a longitudinal cut into said bar stock with one or more pairs of circular cutting tools to a predetermined distance so as to separate a cylinder from said core of said bar stock, then withdrawing said circular cutting tools and thereafter making a radial cut into said cylinder with one or more pairs of straight cutting tools so as to sever a ring from said cylinder, then withdrawing said straight cutting tools radially from said bar stock and thereafter moving said straight cutting tools longitudinally along said bar stock a predetermined distance, then making another radial cut into said cylinder with said straight cutting tools so as to sever another ring from said cylinder, and thereafter repeating said radial cutting operations until said cylinder has been cut up into several rings, then withdrawing said straight cutting tools and thereafter moving said several rings along said core away from all cutting tools, and thereafter repeating said operations in the same sequence to cut a cylinder first and secondly to cut rings from said cylinder as described.

7. Method of cutting rings from bar stock as claimed in claim 6 but making multiple radial cuts into said cylinder simultaneously with multiple pairs of straight cutting tools spaced apart along said bar stock precalculated distances to equal the thicknesses of the several rings being cut from said cylinder.

References Cited in the file of this patent

UNITED STATES PATENTS

| | | |
|---|---|---|
| 876,852 | Watson | Jan. 14, 1908 |
| 1,328,509 | Ganster | Jan. 20, 1920 |
| 1,397,541 | Owens | Nov. 22, 1921 |
| 1,477,570 | Lehman | Dec. 18, 1923 |
| 1,606,282 | Witter | Nov. 9, 1926 |
| 1,683,011 | Andren | Sept. 4, 1928 |
| 1,695,955 | Frayer | Dec. 18, 1928 |
| 1,839,909 | Weatherhead | Jan. 5, 1932 |
| 1,854,825 | Connell | Apr. 19, 1932 |
| 1,854,897 | Ganster | Apr. 19, 1932 |
| 1,951,397 | Covert | Mar. 20, 1934 |
| 2,103,315 | Birkebak | Dec. 28, 1937 |
| 2,160,732 | Haynes | May 30, 1939 |
| 2,277,084 | Drissner | Mar. 24, 1942 |
| 2,335,570 | Montgomery | Nov. 30, 1943 |
| 2,508,183 | Mitchell | May 16, 1950 |